United States Patent
Kojima

(10) Patent No.: US 10,071,598 B2
(45) Date of Patent: Sep. 11, 2018

(54) STUDLESS WINTER TIRE

(71) Applicant: SUMITOMO RUBBER INDUSTRIES, LTD., Kobe-shi, Hyogo (JP)

(72) Inventor: Ryoji Kojima, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 144 days.

(21) Appl. No.: 14/566,337

(22) Filed: Dec. 10, 2014

(65) Prior Publication Data
US 2015/0191047 A1 Jul. 9, 2015

(30) Foreign Application Priority Data
Jan. 8, 2014 (JP) .................... 2014-001832

(51) Int. Cl.
*B60C 11/00* (2006.01)
*B60C 1/00* (2006.01)
*C08L 7/00* (2006.01)
*C08L 9/00* (2006.01)

(52) U.S. Cl.
CPC .......... *B60C 11/005* (2013.01); *B60C 1/0016* (2013.01); *C08L 7/00* (2013.01); *C08L 9/00* (2013.01)

(58) Field of Classification Search
CPC . B60C 1/00; B60C 1/0016; B60C 2001/0083; B60C 11/00; B60C 11/0008; B60C 2011/0016; B60C 11/0041; B60C 11/005
USPC ............................... 162/209.5, 905
See application file for complete search history.

(56) References Cited

U.S. PATENT DOCUMENTS

| | | | |
|---|---|---|---|
| 4,381,810 A | 5/1983 | Cady et al. | |
| 6,472,461 B1 * | 10/2002 | Nakamura | B60C 1/0016 152/209.5 |
| 7,028,734 B2 * | 4/2006 | Ozel | B60C 1/0016 152/209.5 |
| 2007/0006953 A1 * | 1/2007 | Galimberti | B60C 1/0016 152/209.5 |
| 2014/0027029 A1 * | 1/2014 | Kondo | B60C 11/00 152/209.1 |

FOREIGN PATENT DOCUMENTS

| | | |
|---|---|---|
| JP | 57-194105 A | 11/1982 |
| JP | 5-262103 A | 10/1993 |
| JP | 6-278410 A | 10/1994 |
| JP | 10-6713 * | 1/1998 |
| JP | 10-6713 A | 1/1998 |
| JP | 2007-176417 A | 7/2007 |
| JP | 2009-91482 A | 4/2009 |

OTHER PUBLICATIONS

JP 10-6713, Jan. 13, 1998, English language machine translation [retrieved from http://www.epo.org].*

* cited by examiner

*Primary Examiner* — Eric Hug
(74) *Attorney, Agent, or Firm* — Birch, Stewart, Kolasch & Birch, LLP

(57) ABSTRACT

A studless winter tire that has enhanced performance on ice and snow both initially and after degradation while maintaining good abrasion resistance is provided. The studless winter tire includes: a cap tread formed from a rubber composition A; and a base tread formed from a rubber composition B. The studless winter tire satisfies the following formulas (1) and (2): (1) $a \times c/100 < b \times d/100$; and (2) $a \geq 8$, where a represents the softener content (% by mass) based on 100% by mass of the rubber composition A; b represents the softener content (% by mass) based on 100% by mass of the rubber composition B; c represents the percentage by mass (% by mass) of the cap tread based on the entire tread; and d represents the percentage by mass (% by mass) of the base tread based on the entire tread.

6 Claims, No Drawings

STUDLESS WINTER TIRE

TECHNICAL FIELD

The present invention relates to a studless winter tire.

BACKGROUND ART

Studded tires or snow chains were used for driving on snowy and icy roads; however, they unfortunately cause environmental problems, such as dust pollution. Studless winter tires were thus developed as alternative tires for driving on snowy and icy roads. Since studless winter tires are for use on snowy roads with rougher surfaces than normal roads, the materials and structure thereof are specially designed. For example, a rubber composition that contains a diene rubber having excellent low-temperature properties, and a rubber composition that contains a large amount of softener to enhance the softening effect have been developed (for example, Patent Literature 1).

Some attempts have been made to enhance the performance on ice and snow of studless winter tires, for example, by increasing the softener content in the rubber composition. However, too high a softener content may cause the tread rubber to undergo a greater change in hardness with age (hardening degradation), which may reduce the performance on ice and snow with age (hereinafter, also referred to as performance on ice and snow after degradation). Thus, the softener content cannot be increased unlimitedly. Moreover, since the initial performance on ice and snow and the resistance to change in hardness with age are opposed to each other, it has been hard to simultaneously enhance the "performance on ice and snow after degradation" and the "initial performance on ice and snow."

CITATION LIST

Patent Literature

Patent Literature 1: JP 2009-091482 A

SUMMARY OF INVENTION

Technical Problem

The present invention has been made with the foregoing considerations in mind, and aims to provide a studless winter tire that has enhanced performance on ice and snow both initially and after degradation while maintaining good abrasion resistance.

Solution to Problem

The present invention relates to a studless winter tire including: a cap tread formed from a rubber composition A; and a base tread formed from a rubber composition B, wherein the studless winter tire satisfies the following formulas (1) and (2):

$$a \times c/100 < b \times d/100; \text{ and} \quad (1)$$

$$a \geq 8 \quad (2)$$

wherein a represents the softener content (% by mass) based on 100% by mass of the rubber composition A; b represents the softener content (% by mass) based on 100% by mass of the rubber composition B; c represents the percentage by mass (% by mass) of the cap tread based on the entire tread; and d represents the percentage by mass (% by mass) of the base tread based on the entire tread.

Preferably, the rubber composition A includes: natural rubber in an amount of 30 to 80% by mass based on 100% by mass of a rubber component of the rubber composition A; and polybutadiene rubber in an amount of 20 to 70% by mass based on 100% by mass of the rubber component.

Advantageous Effects of Invention

In the studless winter tire of the present invention, the softener contents in the cap tread and the base tread satisfy a predetermined relationships, which allows the studless winter tire to have enhanced performance on ice and snow both initially and after degradation while maintaining good abrasion resistance.

DESCRIPTION OF EMBODIMENTS

The studless winter tire of the present invention includes a cap tread and a base tread. The cap tread is an outer surface layer of a tread having a multilayered structure. The base tread is an inner layer of the tread having a multilayered structure. A two-layered tread consists of an outer surface layer (cap tread) and an inner layer (base tread).

In the studless winter tire of the present invention, the tread preferably has a two-layered structure consisting of a cap tread and a base tread.

According to the present invention, the cap tread is formed from a rubber composition A while the base tread is formed from a rubber composition B. Then, the studless winter tire satisfies the following formulas (1) and (2):

$$a \times c/100 < b \times d/100; \text{ and} \quad (1)$$

$$a \geq 8 \quad (2)$$

wherein a represents the softener content (% by mass) based on 100% by mass of the rubber composition A; b represents the softener content (% by mass) based on 100% by mass of the rubber composition B; c represents the percentage by mass (% by mass) of the cap tread based on the entire tread; and d represents the percentage by mass (% by mass) of the base tread based on the entire tread.

The notation "$a \times c/100$" and the notation "$b \times d/100$" in the formula (1) are respectively an index of the softener content in the cap tread and an index of the softener content in the base tread.

In general, in the case where the softener content in a cap tread exceeds the softener content in a base tread, migration of softener from the cap tread to the base tread is accelerated due to a concentration gradient between the components. According to the present invention, in contrast, the softener content in the cap tread is smaller than the softener content in the base tread so that the migration of softener from the cap tread to the base tread can be suppressed, which can therefore reduce the change in hardness with age. Thus, the present invention allows new tires to have enhanced performance on ice and snow and also allows to suppress reduction in performance on ice and snow caused by changes in hardness with age, therefore simultaneously enhancing the initial performance on ice and snow and the performance on ice and snow after degradation.

The change in hardness with age herein means a degradation phenomenon in which the hardness of rubber heated in the presence of oxygen, a degradation factor, is increased compared to the initial hardness.

According to the present invention, the softener refers to an acetone-soluble component. Specific examples of the softener include oils, such as process oils and vegetable fats and oils, and liquid diene polymers.

The softener content a based on 100% by mass of the rubber composition A is 8% by mass or more. In order to better achieve the effects of the present invention, the softener content a is preferably 9% by mass or more, and more preferably 10% by mass or more, but is preferably 30% by mass or less, more preferably 25% by mass or less, and still more preferably 23% by mass or less.

The softener content a can be readily determined as an acetone-soluble component.

According to the present invention, the softener content a based on 100% by mass of the rubber composition A may be adjusted within a range satisfying the formulas (1) and (2).

In order to better achieve the effects of the present invention, the softener content b based on 100% by mass of the rubber composition B is preferably 8% by mass or more, more preferably 9% by mass or more, and still more preferably 10% by mass or more, but is preferably 30% by mass or less, more preferably 25% by mass or less, and still more preferably 23% by mass or less.

The softener content b can be readily determined as an acetone-soluble component.

According to the present invention, the softener content b based on 100% by mass of the rubber composition B may be adjusted within a range satisfying the formula (1).

In order to better achieve the effects of the present invention, the percentage by mass c of the cap tread based on the entire tread is preferably 35% by mass or more, more preferably 40% by mass or more, and still more preferably 45% by mass or more, but is preferably 70% by mass or less, more preferably 60% by mass or less, and still more preferably 55% by mass or less.

The percentage by mass c of the cap tread can be readily determined by observing a cross section of the tire.

In order to better achieve the effects of the present invention, the percentage by mass d of the base tread based on the entire tread is preferably 35% by mass or more, more preferably 40% by mass or more, and still more preferably 45% by mass or more, but is preferably 70% by mass or less, more preferably 60% by mass or less, and still more preferably 55% by mass or less.

The percentage by mass d of the base tread can be readily determined by observing a cross section of the tire.

According to the present invention, the percentage by mass c of the cap tread and the percentage by mass d of the base tread based on the entire tread may each be adjusted within a range satisfying the formula (1).

In the present invention, the value of a×c/100 is preferably 6 or more, more preferably 6.5 or more, and still more preferably 7 or more, but is preferably 13 or less, more preferably 12.5 or less, and still more preferably 12 or less. The value of b×d/100 is preferably 7 or more, more preferably 7.5 or more, and still more preferably 8 or more, but is preferably 13 or less, more preferably 12.5 or less, and still more preferably 12 or less.

The rubber composition A and the rubber composition B are described in detail below.

Rubber Composition A

The rubber composition A contains at least a rubber component and a softener.

The rubber component of the rubber composition A preferably includes natural rubber (NR) and polybutadiene rubber (BR). In this case, migration of the softener can be suitably suppressed, so that the effects of the present invention can be better achieved.

Examples of NR used in the rubber composition A include common NRs, such as TSR 20 and RSS#3.

In the rubber composition A, the NR content based on 100% by mass of the rubber component is preferably 30% by mass or more, and more preferably 40% by mass or more. If the NR content is less than 30% by mass, the effect of reducing the change in hardness with age may not be sufficient. The NR content based on 100% by mass of the rubber component is preferably 80% by mass or less, and more preferably 70% by mass or less. A NR content of more than 80% by mass may make it impossible to ensure low-temperature properties needed for studless winter tires. This may not allow the tire to exert its performance on ice and snow.

The rubber composition A may contain any BR. Examples of BR include: high-cis BRs, such as BR730 and BR51 produced by JSR Corporation, BR1220 produced by Zeon Corporation, and BR130B, BR150B and BR710 produced by Ube Industries, Ltd.; and low-cis BRs, such as BR1250H produced by Zeon Corporation. These BRs may be used alone or in combination of two or more.

The cis content in BR is preferably 80% by mass or more, more preferably 85% by mass or more, still more preferably 90% by mass or more, and particularly preferably 95% by mass or more. In such cases, better performance on ice and snow can be obtained.

The cis content values herein are determined by infrared absorption spectrum analysis.

In the rubber composition A, the BR content based on 100% by mass of the rubber component is preferably 20% by mass or more, more preferably 30% by mass or more, and still more preferably 40% by mass or more. If the BR content is less than 20% by mass, then low-temperature properties needed for studless winter tires may not be ensured. This may not allow the tire to exert its performance on ice and snow. The BR content based on 100% by mass of the rubber component is preferably 70% by mass or less, and more preferably 60% by mass or less. If the BR content is more than 70% by mass, then the NR and BR may form a reversed sea-island structure in which the sea component is BR, which has higher molecular mobility. In this case, migration of the softener may be accelerated.

Examples of rubbers that may be used in the rubber component of the rubber composition A, other than the NR and BR, include polyisoprene rubber (IR), styrene-butadiene copolymer rubber (SBR), butadiene-isoprene copolymer rubber, and butyl rubber.

The rubber composition A contains a softener. The use of a softener reduces the hardness of rubber, resulting in better performance on ice and snow.

The rubber composition A may contain any softener as long as the softener is soluble in acetone. Suitable examples of the softeners include oils and liquid diene polymers. These softeners may be used alone or in combination of two or more. Oils are especially preferred.

For example, process oils, vegetable fats and oils, and mixtures thereof may be mentioned as the oils. Examples of the process oils include paraffinic process oils, naphthenic process oils, and aromatic process oils (aromatic oils). Examples of the vegetable fats and oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. Aromatic oils are especially preferred.

The liquid diene polymers are not particularly limited as long as they are diene polymers having a weight average molecular weight of 50000 or less. Examples thereof include styrene-butadiene copolymer (rubber), polybutadiene polymer (rubber), polyisoprene polymer (rubber), and acrylonitrile butadiene copolymer (rubber). Liquid styrene-butadiene copolymer (liquid styrene-butadiene rubber (liquid SBR)) is preferred among the liquid diene polymers because it is highly effective in enhancing performance on ice and snow. Moreover, liquid polybutadiene polymer (liquid polybutadiene rubber (liquid BR)) is preferred because it is highly effective in enhancing abrasion resistance.

The liquid diene polymer preferably has a weight average molecular weight (Mw) of 1000 or more, more preferably 1500 or more. A Mw of less than 1000 tends to result in reduced abrasion resistance. The liquid diene polymer has a Mw of 50000 or less, preferably 20000 or less, and more preferably 15000 or less. A Mw of more than 50000 tends to result in a reduction in performance on ice and snow, especially in initial performance on ice and snow. Additionally, such a large Mw tends to cause a smaller difference from the molecular weight of the rubber component, so that the effect of the softener tends not to be easily exerted. The weight average molecular weight (Mw) herein can be determined by gel permeation chromatography (GPC) (GPC 8000 series produced by Tosoh Corporation; detector: differential refractive index detector; column: TSKGEL SUPERMULTIPORE HZ-M produced by Tosoh Corporation) relative to polystyrene standards.

In the rubber composition A, the softener content per 100 parts by mass of the rubber component is preferably 20 parts by mass or more, more preferably 22 parts by mass or more, and still more preferably 25 parts by mass or more. Less than 20 parts by mass of softener may fail to ensure low-temperature properties needed for studless winter tires. This may not allow the tire to exert its performance on ice and snow. The softener content is preferably 60 parts by mass or less, more preferably 55 parts by mass or less, and still more preferably 50 parts by mass or less. More than 60 parts by mass of softener may deteriorate abrasion resistance even when the softener content in the base tread is appropriately adjusted.

The rubber composition A preferably contains carbon black. The use of carbon black provides a reinforcing effect, so that the effects of the present invention can be better achieved.

The carbon black preferably has a nitrogen adsorption specific surface area ($N_2SA$) of 50 $m^2/g$ or more, more preferably 90 $m^2/g$ or more. The carbon black having a $N_2SA$ of less than 50 $m^2/g$ may fail to provide sufficient reinforcement, thus resulting in insufficient abrasion resistance and performance on ice and snow. The carbon black preferably has a $N_2SA$ of 180 $m^2/g$ or less, more preferably 130 $m^2/g$ or less. The carbon black having a $N_2SA$ of more than 180 $m^2/g$ tends to be difficult to disperse, and thus tends to deteriorate abrasion resistance.

The $N_2SA$ of carbon black is determined in accordance with JIS K 6217-2:2001.

The carbon black preferably has a dibutyl phthalate oil absorption (DBP) of 50 ml/100 g or more, more preferably 100 ml/100 g or more. The carbon black having a DBP of less than 50 ml/100 g may fail to provide sufficient reinforcement, thus resulting in insufficient abrasion resistance and performance on ice and snow. The carbon black preferably has a DBP of 200 ml/100 g or less, more preferably 135 ml/100 g or less. The carbon black having a DBP of more than 200 ml/100 g may reduce processability and abrasion resistance.

The DBP of carbon black is determined in accordance with JIS K 6217-4:2001.

In the rubber composition A, the carbon black content per 100 parts by mass of the rubber component is preferably 10 parts by mass or more, and more preferably 20 parts by mass or more. Less than 10 parts by mass of carbon black may fail to provide sufficient reinforcement, thus resulting in insufficient abrasion resistance and performance on ice and snow. The carbon black content is preferably 80 parts by mass or less, more preferably 60 parts by mass or less, and still more preferably 40 parts by mass or less. More than 80 parts by mass of carbon black tends to result in deteriorated dispersibility and therefore in deteriorated abrasion resistance.

The rubber composition A preferably contains silica. The use of silica provides a reinforcing effect, so that the effects of the present invention can be better achieved. Examples of silica include dry silica (anhydrous silica) and wet silica (hydrous silica). Wet silica is especially preferred because it contains a larger amount of silanol groups.

The silica preferably has a nitrogen adsorption specific surface area ($N_2SA$) of 40 $m^2/g$ or more, more preferably 70 $m^2/g$ or more, and still more preferably 110 $m^2/g$ or more. The silica having a $N_2SA$ of less than 40 $m^2/g$ may fail to provide sufficient reinforcement, thus resulting in insufficient abrasion resistance and performance on ice and snow. The silica preferably has a $N_2SA$ of 220 $m^2/g$ or less, more preferably 200 $m^2/g$ or less. The silica having a $N_2SA$ of more than 220 $m^2/g$ tends to be difficult to disperse, and thus tends to deteriorate abrasion resistance.

The $N_2SA$ values of silica are determined by the BET method in accordance with ASTM D3037-93.

In the rubber composition A, the silica content per 100 parts by mass of the rubber component is preferably 10 parts by mass or more, and more preferably 20 parts by mass or more. Less than 10 parts by mass of silica may fail to provide sufficient reinforcement, thus resulting in insufficient abrasion resistance and performance on ice and snow. The silica content is preferably 80 parts by mass or less, more preferably 60 parts by mass or less, and still more preferably 40 parts by mass or less. More than 80 parts by mass of silica tends to result in deteriorated dispersibility and therefore in deteriorated abrasion resistance.

In the case where the rubber composition A contains silica, it preferably contains a silane coupling agent in combination with the silica.

Any silane coupling agent that has conventionally been used in combination with silica in the rubber industry can be used. Examples thereof include sulfide silane coupling agents such as bis (3-triethoxysilylpropyl)disulfide, mercapto silane coupling agents such as 3-mercaptopropyltrimethoxysilane, vinyl silane coupling agents such as vinyltriethoxysilane, amino silane coupling agents such as 3-aminopropyltriethoxysilane, glycidoxy silane coupling agents such as γ-glycidoxypropyltriethoxysilane, nitro silane coupling agents such as 3-nitropropyltrimethoxysilane, and chloro silane coupling agents such as 3-chloropropyltrimethoxysilane. Preferred among these are sulfide silane coupling agents, with bis(3-triethoxysilylpropyl)disulfide being more preferred.

In the rubber composition A, the silane coupling agent content per 100 parts by mass of silica is preferably 1 part by mass or more, and more preferably 3 parts by mass or more. Less than 1 part by mass of silane coupling agent may fail to provide sufficient reinforcement, thus resulting in insufficient abrasion resistance and performance on ice and snow. The silane coupling agent content is preferably 15 parts by mass or less, and more preferably 10 parts by mass or less. More than 15 parts by mass of silane coupling agent tends not to produce an effect proportional to the increase in the cost.

The rubber composition A may appropriately contain additives that are generally used in the tire industry, other than the above components. Examples of such additives include wax, stearic acid, zinc oxide, antioxidants, vulcanizing agents such as sulfur, and vulcanization accelerators.

Examples of the vulcanization accelerators include sulfenamide, thiazole, thiuram, thiourea, guanidine, dithiocarbamate, aldehyde-amine or aldehyde-ammonia, imidazoline, and xanthate vulcanization accelerators. These vulcanization accelerators may be used alone or in combination of two or more. Sulfenamide vulcanization accelerators are preferred among these, and combinations of sulfenamide vulcanization accelerators with guanidine vulcanization accelerators (e.g. diphenylguanidine) are more preferred, because they contribute to better achieving the effects of the present invention.

Examples of the sulfenamide vulcanization accelerators include N-tert-butyl-2-benzothiazolylsulfenamide (TBBS), N-cyclohexyl-2-benzothiazolylsulfenamide (CBS), and N,N-dicyclohexyl-2-benzothiazolylsulfenamide (DCBS). CBS is preferred among these, and combinations of CBS with guanidine vulcanization accelerators (e.g. diphenylguanidine) are more preferred, because they contribute to better achieving the effects of the present invention.

Rubber Composition B

The rubber composition B contains at least a rubber component and a softener.

The rubber component of the rubber composition B preferably includes natural rubber (NR) and polybutadiene rubber (BR). In this case, Migration of the softener can be suitably suppressed, so that the effects of the present invention can be better achieved.

The NR used in the rubber composition B may be as described for the rubber composition A.

In the rubber composition B, the NR content based on 100% by mass of the rubber component is preferably 30% by mass or more, and more preferably 40% by mass or more. If the NR content is less than 30% by mass, then the effect of reducing the change in hardness with age may not be sufficient. The NR content based on 100% by mass of the rubber component is preferably 80% by mass or less, and more preferably 70% by mass or less. A NR content of more than 80% by mass may make it impossible to ensure low-temperature properties needed for studless winter tires. This may not allow the tire to exert its performance on ice and snow.

The BR used in the rubber composition B may be as described for the rubber composition A.

In the rubber composition B, the BR content based on 100% by mass of the rubber component is preferably 20% by mass or more, more preferably 30% by mass or more, and still more preferably 40% by mass or more. If the BR content is less than 20% by mass, then low-temperature properties needed for studless winter tires may not be ensured. This may not allow the tire to exert its performance on ice and snow. The BR content based on 100% by mass of the rubber component is preferably 70% by mass or less, and more preferably 60% by mass or less. If the BR content is more than 70% by mass, then the NR and BR may form a reversed sea-island structure in which the sea component is BR, which has higher molecular mobility. In this case, migration of the softener may be accelerated.

Examples of rubbers that may be used in the rubber component of the rubber composition B, other than the NR and BR, include polyisoprene rubber (IR), styrene-butadiene copolymer rubber (SBR), butadiene-isoprene copolymer rubber, and butyl rubber, as in the case of the rubber composition A.

The rubber composition B contains a softener. The use of a softener reduces the hardness of rubber, resulting in better performance on ice and snow.

The softener used in the rubber composition B may be as described for the rubber composition A.

In the rubber composition B, the softener content per 100 parts by mass of the rubber component is preferably 5 parts by mass or more, more preferably 10 parts by mass or more, and still more preferably 15 parts by mass or more. Less than 5 parts by mass of softener may fail to ensure low-temperature properties needed for studless winter tires. This may not allow the tire to exert its performance on ice and snow. The softener content is preferably 60 parts by mass or less, more preferably 55 parts by mass or less, and still more preferably 50 parts by mass or less. More than 60 parts by mass of softener leads to a lack of breaking properties needed for the base tread, thus causing tread chunking or the like during running.

The rubber composition B, as in the case of the rubber composition A, preferably contains carbon black and/or silica. Moreover, in the case where the rubber composition B contains silica, it preferably contains a silane coupling agent in combination with the silica. These components may be those as described for the rubber composition A which may be suitably used in embodiments as mentioned for the rubber composition A.

In the rubber composition B, the carbon black content per 100 parts by mass of the rubber component is preferably 10 parts by mass or more, and more preferably 20 parts by mass or more. Less than 10 parts by mass of carbon black may fail to provide sufficient reinforcement, thus resulting in insufficient abrasion resistance and performance on ice and snow. The carbon black content is preferably 90 parts by mass or less, more preferably 85 parts by mass or less, and still more preferably 80 parts by mass or less. More than 90 parts by mass of carbon black tends to result in deteriorated dispersibility and therefore in deteriorated abrasion resistance.

Similarly to the rubber composition A, the rubber composition B may appropriately contain additives that are generally used in the tire industry, other than the above components. Examples of such additives include wax, stearic acid, zinc oxide, antioxidants, vulcanizing agents such as sulfur, and vulcanization accelerators.

Vulcanization accelerators as described for the rubber composition A may be used.

The rubber compositions A and B can each be prepared by a usual method. Specifically, the above components may be kneaded with a Banbury mixer, a kneader, an open roll mill or the like, and then vulcanized to prepare the rubber composition.

As mentioned earlier, the rubber composition A is used for the cap tread of the studless winter tire while the rubber composition B is used for the base tread of the studless winter tire.

Multilayered treads can be prepared by preparing sheet-shaped rubber compositions and then bonding them into a predetermined shape, or alternatively, by introducing rubber compositions into an extruder having at least two rolls, and forming them into two or more layers at the head outlet of the extruder.

The studless winter tire of the present invention can be produced by a usual method using the rubber compositions described above. Specifically, unvulcanized rubber compositions each containing the rubber component, softener, and optionally the above-described various additives are extruded and processed into the shape of a tread, and then assembled with other tire components in a tire building machine by a usual method to build an unvulcanized tire. The unvulcanized tire is heated under pressure in a vulcanizer so that a studless winter tire of the present invention can be obtained.

The studless winter tire of the present invention can be suitably used for passenger vehicles.

EXAMPLES

The present invention is now specifically described referring to examples but is not limited to these examples.

The chemicals used in examples and comparative examples are listed below.

Natural rubber (NR): RSS#3
Polybutadiene rubber (BR): BR1220 (cis content: 96% by mass) produced by Zeon Corporation
Carbon black: Seast N220 ($N_2SA$: 114 $m^2/g$, DBP: 114 ml/100 g) produced by Mitsubishi Chemical Corporation
Silica: Ultrasil VN3 ($N_2SA$: 175 $m^2/g$, average primary particle size: 15 nm) produced by Evonik Degussa
Silane coupling agent: Si75
(bis (3-triethoxysilylpropyl)disulfide) produced by Evonik Degussa
Oil: Process X-140 (aromatic oil) produced by JX Nippon Oil & Energy Corporation
Wax: Sunnoc N produced by Ouchi Shinko Chemical Industrial Co., Ltd.
Zinc oxide: Zinc oxide #1 produced by Mitsui Mining and Smelting Co., Ltd.
Stearic acid: stearic acid "Tsubaki" produced by NOF Corporation
Antioxidant: Antigene 6C (N-(1,3-dimethylbutyl)-N'-phenyl-p-phenylenediamine) produced by Sumitomo Chemical Co., Ltd.
Sulfur: powdered sulfur produced by Karuizawa Sulfur
Vulcanization accelerator (1): Nocceler CZ (N-cyclohexyl-2-benzothiazolylsulfenamide) produced by Ouchi Shinko Chemical Industrial Co., Ltd.
Vulcanization accelerator (2): Nocceler D (N,N'-diphenylguanidine) produced by Ouchi Shinko Chemical Industrial Co., Ltd.

EXAMPLES AND COMPARATIVE EXAMPLES

The materials in each of the formulations shown in Tables 1 and 2, except the sulfur and the vulcanization accelerators, were kneaded in a 1.7-L Banbury mixer (produced by Kobe Steel, Ltd.) at a temperature of about 150° C. for 5 minutes to provide a kneaded mixture (depending on the formulation, the oil was introduced in two portions in the kneading). Then, the sulfur and vulcanization accelerators in formulation amounts shown in Table 1 or 2 were added to the kneaded mixture, and they were kneaded using an open roll mill at a temperature of about 80° C. for 3 minutes, thereby providing an unvulcanized rubber composition. The thus obtained unvulcanized rubber compositions were formed into treads according to the combinations shown in Table 3.

Each of the treads was assembled with other tire components in a tire building machine into a raw tire, which was then vulcanized at a temperature of 170° C. for 15 minutes to prepare a test tire (size: 195/65R15).

The thus obtained test tires were evaluated by the following tests. Table 3 shows the results.

Performance on Ice and Snow (New Product)

The test tires were mounted on a 2000-cc front-engine, rear-wheel-drive car made in Japan and then actually driven on ice and snow under the following conditions to evaluate performance on ice and snow. Specifically, in the evaluation of performance on ice and snow, the car was driven on ice or snow and the brakes that lock up were applied at 30 km/h. The stopping distances (brake stopping distance on ice, brake stopping distance on snow), which were the distances required for the car to stop after the braking, were measured, and expressed as indexes calculated using the formula below. A higher index indicates better grip performance on ice and snow.

$$(\text{Braking performance index}) = (\text{Brake stopping distance in Comparative Example 1})/(\text{Brake stopping distance of each formulation}) \times 100$$

| | (on ice) | (on snow) |
|---|---|---|
| Test place: | Test track in Nayoro, Hokkaido | Test track in Nayoro, Hokkaido |
| Temperature: | −1 to −6° C. | −2 to −10° C. |

Performance on Ice and Snow (Degraded Product)

In order to reproduce the conditions after aging degradation, the test tires were thermally degraded by heating them in an oven at a temperature of 80° C. for 168 hours. The resulting tires were evaluated for performance on ice and snow under the same conditions as described for the above Performance on Ice and Snow (New Product) Test Abrasion Resistance The test tires were mounted on a front-engine, front-wheel-drive car made in Japan, and the depth of grooves on the tire tread part was measured after the car had run 8000 km. A running distance that decreased the depth of tire grooves by 1 mm was calculated and expressed as an index using the formula below. A higher index indicates better abrasion resistance. Indexes of 90 or higher are rated good.

$$(\text{Abrasion resistance index}) = (\text{Running distance that decreased tire groove depth by 1 mm in each example})/(\text{Running distance that decreased tire groove depth by 1 mm in Comparative Example 1}) \times 100$$

TABLE 1

Rubber composition A (Cap tread)

| | | | C-1 | C-2 | C-3 | C-4 | C-5 | C-6 | C-7 | C-8 | C-9 |
|---|---|---|---|---|---|---|---|---|---|---|---|
| Formulation (parts by mass) | Step 1 | NR | 50 | 40 | 15 | 60 | 85 | 50 | 50 | 50 | 50 |
| | | BR | 50 | 60 | 85 | 40 | 15 | 50 | 50 | 50 | 50 |
| | | Carbon black | 30 | 30 | 30 | 30 | 30 | 30 | 30 | 30 | 30 |
| | | Silica | 30 | 30 | 30 | 30 | 30 | 30 | 30 | 30 | 30 |
| | | Silane coupling agent | 2 | 2 | 2 | 2 | 2 | 2 | 2 | 2 | 2 |
| | | Oil | 40 | 40 | 40 | 40 | 40 | 15 | 30 | 50 | 70 |
| | | Wax | 2 | 2 | 2 | 2 | 2 | 2 | 2 | 2 | 2 |
| | | Zinc oxide | 2 | 2 | 2 | 2 | 2 | 2 | 2 | 2 | 2 |
| | | Stearic acid | 2 | 2 | 2 | 2 | 2 | 2 | 2 | 2 | 2 |
| | | Antioxidant | 2 | 2 | 2 | 2 | 2 | 2 | 2 | 2 | 2 |
| | Step 2 | Sulfur | 1.5 | 1.5 | 1.5 | 1.5 | 1.5 | 1.5 | 1.5 | 1.5 | 1.5 |
| | | Vulcanization accelerator (1) | 2 | 2 | 2 | 2 | 2 | 2 | 2 | 2 | 2 |
| | | Vulcanization accelerator (2) | 2 | 2 | 2 | 2 | 2 | 2 | 2 | 2 | 2 |
| Total | | | 215.5 | 215.5 | 215.5 | 215.5 | 215.5 | 190.5 | 205.5 | 225.5 | 245.5 |
| Softener content a (% by mass) | | | 18.6 | 18.6 | 18.6 | 18.6 | 18.6 | 7.9 | 14.6 | 22.2 | 28.5 |

TABLE 2

Rubber composition B (Base tread)

| | | | B-1 | B-2 | B-3 |
|---|---|---|---|---|---|
| Formulation (parts by mass) | Step 1 | NR | 50 | 50 | 50 |
| | | BR | 50 | 50 | 50 |
| | | Carbon black | 80 | 80 | 80 |
| | | Oil | 30 | 45 | 56 |
| | | Wax | 2 | 2 | 2 |
| | | Zinc oxide | 2 | 2 | 2 |
| | | Stearic acid | 2 | 2 | 2 |
| | | Antioxidant | 2 | 2 | 2 |
| | Step 2 | Sulfur | 1.5 | 1.5 | 1.5 |
| | | Vulcanization accelerator (1) | 2 | 2 | 2 |
| | | Vulcanization accelerator (2) | 2 | 2 | 2 |
| Total | | | 223.5 | 238.5 | 249.5 |
| Softener content b (% by mass) | | | 13.4 | 18.9 | 22.4 |

TABLE 3

Studless winter tire

| | | Com. Ex. 1 | Ex. 1 | Ex. 2 | Ex. 3 | Ex. 4 | Ex. 5 | Ex. 6 | Ex. 7 | Com. Ex. 2 | Com. Ex. 3 |
|---|---|---|---|---|---|---|---|---|---|---|---|
| Cap tread | | C-6 | C-1 | C-1 | C-7 | C-8 | C-1 | C-1 | C-7 | C-1 | C-2 |
| Softener content a (% by mass) | | 7.9 | 18.6 | 18.6 | 14.6 | 22.2 | 18.6 | 18.6 | 14.6 | 18.6 | 18.6 |
| Base tread | | B-1 | B-2 | B-3 | B-2 | B-3 | B-2 | B-1 | B-3 | B-1 | B-1 |
| Softener content b (% by mass) | | 13.4 | 18.9 | 22.4 | 18.9 | 22.4 | 18.9 | 13.4 | 22.4 | 13.4 | 13.4 |
| Percentage by mass c of cap tread (% by mass) | | 50 | 50 | 50 | 50 | 50 | 40 | 40 | 60 | 50 | 50 |
| Percentage by mass d of base tread (% by mass) | | 50 | 50 | 50 | 50 | 50 | 60 | 60 | 40 | 50 | 50 |
| a × c/100 | | 3.95 | 9.3 | 9.3 | 7.3 | 11.1 | 7.44 | 7.44 | 8.76 | 9.3 | 9.3 |
| b × d/100 | | 6.7 | 9.5 | 11.2 | 9.5 | 11.2 | 11.3 | 8.0 | 9.0 | 6.7 | 6.7 |
| Evaluation Results | Performance on ice and snow (New product) | 100 | 105 | 105 | 103 | 115 | 105 | 105 | 103 | 105 | 110 |
| | Performance on ice and snow (Degraded product) | 100 | 105 | 105 | 103 | 112 | 107 | 106 | 103 | 85 | 90 |
| | Abrasion resistance | 100 | 95 | 95 | 97 | 92 | 95 | 95 | 97 | 95 | 95 |

| | | Com. Ex. 4 | Com. Ex. 5 | Com. Ex. 6 | Com. Ex. 7 | Com. Ex. 8 | Com. Ex. 9 | Com. Ex. 10 | Com. Ex. 11 |
|---|---|---|---|---|---|---|---|---|---|
| Cap tread | | C-3 | C-4 | C-5 | C-7 | C-9 | C-9 | C-1 | C-1 |
| Softener content a (% by mass) | | 18.6 | 18.6 | 18.6 | 14.6 | 28.5 | 28.5 | 18.6 | 18.6 |
| Base tread | | B-1 | B-1 | B-1 | B-1 | B-3 | B-1 | B-2 | B-1 |
| Softener content b (% by mass) | | 13.4 | 13.4 | 13.4 | 13.4 | 22.4 | 13.4 | 18.9 | 13.4 |
| Percentage by mass c of cap tread (% by mass) | | 50 | 50 | 50 | 50 | 50 | 40 | 60 | 60 |
| Percentage by mass d of base tread (% by mass) | | 50 | 50 | 50 | 50 | 50 | 60 | 40 | 40 |
| a × c/100 | | 9.3 | 9.3 | 9.3 | 7.3 | 14.3 | 11.4 | 11.2 | 11.2 |
| b × d/100 | | 6.7 | 6.7 | 6.7 | 6.7 | 11.2 | 8.0 | 7.6 | 5.4 |

TABLE 3-continued

| | | Studless winter tire | | | | | | | |
|---|---|---|---|---|---|---|---|---|---|
| Evaluation Results | Performance on ice and snow (New product) | 120 | 100 | 85 | 103 | 125 | 125 | 105 | 105 |
| | Performance on ice and snow (Degraded product) | 80 | 80 | 70 | 83 | 105 | 90 | 90 | 85 |
| | Abrasion resistance | 92 | 96 | 97 | 97 | 80 | 80 | 95 | 95 |

Tables 1 to 3 show that, in the examples where the above-mentioned formulas (1) and (2) are satisfied, not only the new tires but also the tires after degradation have high performance on ice and snow while maintaining good abrasion resistance.

The invention claimed is:

1. A studless winter tire comprising:
a cap tread formed from a rubber composition A; and
a base tread formed from a rubber composition B,
wherein the studless winter tire satisfies the following formulas (1) and (2):

$$a \times c/100 < b \times d/100; \text{ and} \quad (1)$$

$$a \geq 8 \quad (2)$$

wherein a represents the softener content (% by mass) based on 100% by mass of the rubber composition A;
b represents the softener content (% by mass) based on 100% by mass of the rubber composition B;
c represents the percentage by mass (% by mass) of the cap tread based on the entire tread; and
d represents the percentage by mass (% by mass) of the base tread based on the entire tread, and
wherein the rubber composition A contains silica, and d is less than 70% by mass.

2. The studless winter tire according to claim 1, wherein the rubber composition A comprises:
natural rubber in an amount of 30 to 80% by mass based on 100% by mass of a rubber component of the rubber composition A; and
polybutadiene rubber in an amount of 20 to 70% by mass based on 100% by mass of the rubber component.

3. The studless winter tire according to claim 1, wherein the silica has a nitrogen adsorption specific surface area ($N_2SA$) of 40 m²/g or more, and the silica is in an amount of 10% or more by mass based on 100% by mass of a rubber component of the rubber composition A.

4. The studless winter tire according to claim 1, wherein c is no less than 35% by mass.

5. The studless winter tire according to claim 1, wherein a×c ranges from 6 to 13.

6. The studless winter tire according to claim 1, wherein b×d ranges from 7 to 13.

* * * * *